United States Patent
Murphy et al.

(10) Patent No.: US 7,866,702 B2
(45) Date of Patent: Jan. 11, 2011

(54) ENERGY ABSORBING SEAT ANCHOR RESTRAINT SYSTEM FOR CHILD SAFETY SEATS

(75) Inventors: Mark Murphy, Livonia, MI (US); Reddy Malapati, Ypsilanti, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 341 days.

(21) Appl. No.: 11/608,720

(22) Filed: Dec. 8, 2006

(65) Prior Publication Data

US 2008/0135702 A1   Jun. 12, 2008

(51) Int. Cl.
  *B60R 22/28* (2006.01)
  *A62B 35/04* (2006.01)
(52) U.S. Cl. .............. 280/805; 297/472; 297/216.11; 297/470; 188/371
(58) Field of Classification Search ............. 280/805; 297/472, 216.11, 254, 256.16, 253, 250.1, 297/470, 485; 188/371, 374; 403/41
See application file for complete search history.

(56) References Cited

U.S. PATENT DOCUMENTS

| | | | | |
|---|---|---|---|---|
| 3,123,402 A | * | 3/1964 | Elston | 297/468 |
| 3,174,798 A | * | 3/1965 | Sprague | 297/485 |
| 3,198,288 A | | 8/1965 | Presunka | |
| 3,547,468 A | | 12/1970 | Giuffrida | |
| 3,757,900 A | * | 9/1973 | Gischlar | 188/374 |
| 4,358,136 A | | 11/1982 | Tsuge et al. | |
| 5,224,677 A | * | 7/1993 | Close | 248/292.11 |
| 5,639,144 A | | 6/1997 | Naujokas | |
| 5,730,459 A | * | 3/1998 | Kanda | 280/731 |
| 6,485,055 B1 | | 11/2002 | Swayne et al. | |
| 6,517,154 B2 | | 2/2003 | Sawamoto | |
| 6,767,057 B2 | | 7/2004 | Neelis | |
| 6,913,288 B2 | * | 7/2005 | Schulz et al. | 280/805 |
| 2004/0095004 A1 | | 5/2004 | Horton et al. | |
| 2005/0012319 A1 | * | 1/2005 | Schulz | 280/805 |
| 2005/0217608 A1 | | 10/2005 | Johnson et al. | |
| 2006/0049622 A1 | | 3/2006 | Yamamoto | |

FOREIGN PATENT DOCUMENTS

| | | |
|---|---|---|
| DE | 2637406 | 3/1977 |
| WO | 01/46601 | 6/2001 |
| WO | 2005/058635 | 6/2005 |

* cited by examiner

*Primary Examiner*—Paul N Dickson
*Assistant Examiner*—Keith Frisby
(74) *Attorney, Agent, or Firm*—Fredrick Vernon Owens; Alleman Hall McCoy Russell & Tuttle LLP

(57) ABSTRACT

An energy absorbing anchor for securing a child safety seat to a mounting portion of a vehicle and coupling to a tether of the child safety seat is provided. The energy absorbing anchor comprises a bracket including a first end having a tether coupling portion, and a tapered hole having a wide portion adjacent to the first end and a narrow portion opposite to the first end; and a protrusion extending through the tapered hole to secure the bracket to the mounting portion of the vehicle wherein the protrusion is positioned to be adjacent to the wide portion of the tapered hole and wherein the narrow portion of the tapered hole is narrower than a width of the protrusion; wherein, when the bracket is pulled in tension, the protrusion is drawn along a length of the tapered hole towards the narrower portion, thereby deforming a portion of walls of the tapered hole to widen the tapered hole, the walls of tapered hole being configured to increasingly absorb energy as a width of the tapered hole decreases.

14 Claims, 4 Drawing Sheets

ENERGY ABSORBING SEAT ANCHOR RESTRAINT SYSTEM FOR CHILD SAFETY SEATS

FIELD OF INVENTION

The present application relates to an energy absorbing seat anchor restraint system for child seats.

BACKGROUND

To meet Federal Motor Vehicle Safety Standards, a vehicle may include an upper anchor attachment to receive a child safety seat tether hook connected to an upper portion of the child safety seat back. The connection of the upper portion of the child safety seat to the vehicle may reduce the forward movement of the child safety seat during a frontal crash. However, the shock applied by child safety seat restraining equipment to the child safety seat occupant may increase in the case of a forward vehicle collision.

One approach to reduce the impact of the collision force to the child safety seat is described in the U.S. Pat. No. 6,767,057. In particular, anchor attachments to the child safety seat with energy absorbing mechanisms are disclosed. In one example, the upper anchorage assembly includes a Z-shaped bracket having a first end that includes a longitudinally-arranged keyhole and slot with the keyhole positioned forward of the slot. A bolt extends through the keyhole and engages the vehicle structure. If a predetermined forward force is exceeded, then the fixed bolt deforms the bracket materials as it travels forward, enlarging the width of the slot. The deformation of the bracket along the slot absorbs energy.

However, the inventors herein have recognized disadvantages with such an energy absorbing device. Specifically, since the width of the slot is constant, the load applied to the child safety seat may be constant as the bracket travels forward, which may not be desired in some situations. Further, there may be a sudden impact on the child safety seat both when the bracket starts to travel along the slot and when the bolt hits the rearward end of the slot.

SUMMARY OF THE INVENTION

In one approach, the above issues may be addressed by an energy absorbing anchor for securing a child safety seat to a mounting portion of a vehicle and coupling to a tether of the child safety seat. The energy absorbing anchor comprises a bracket including a first end having a tether coupling portion, and a tapered hole having a wide portion adjacent to the first end and a narrow portion opposite to the first end; and a protrusion extending through the tapered hole to secure the bracket to the mounting portion of the vehicle wherein the protrusion is positioned to be adjacent to the wide portion of the tapered hole and wherein the narrow portion of the tapered hole is narrower than a width of the protrusion; wherein, when the bracket is pulled in tension, the protrusion is drawn along a length of the tapered hole towards the narrower portion, thereby deforming a portion of the walls of the tapered hole to widen the tapered hole, the walls of tapered hole being configured to increasingly absorb energy as a width of the tapered hole decreases.

In this way, since the load applied to the child safety seat gradually ramps up, sudden impact on an occupant can be reduced. Further, since the bracket may include a one-piece metal sheet with a tapered hole, it may be easy to manufacture. Furthermore, the attachment assembly may be compact and substantially planar. Thus, it may be easier to be disposed in the vehicle or it can be designed to be at least partially hidden from view of the customers, which improves the aesthetic appearance.

DETAILED DESCRIPTION OF THE PREFERRED EMBODIMENTS

Figure 1:
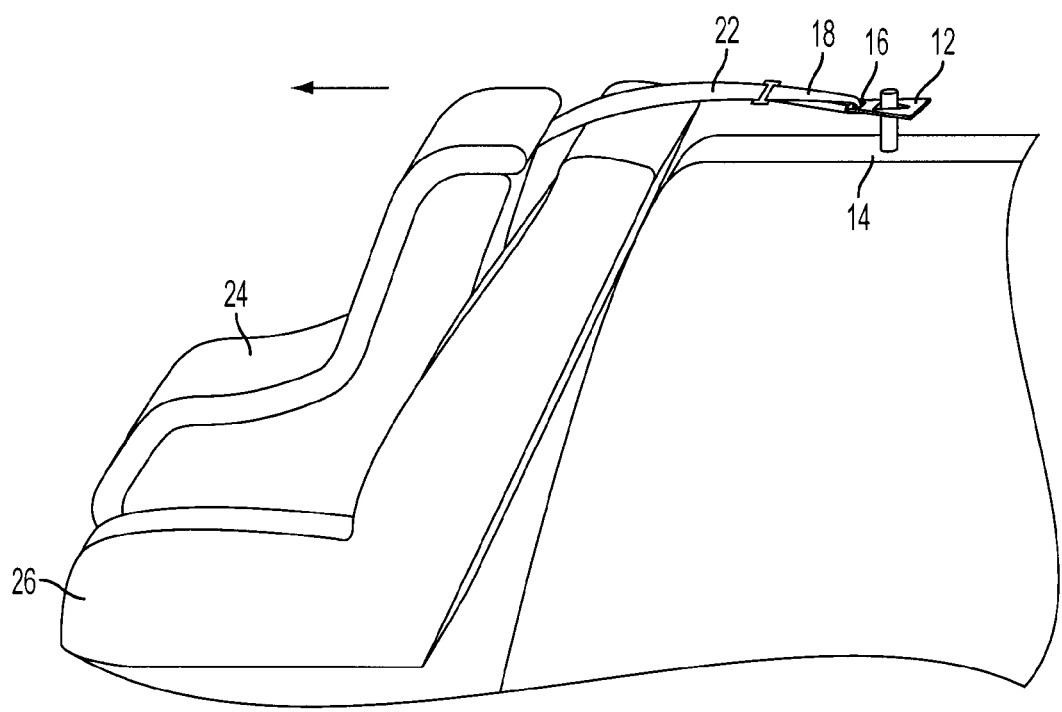
FIG. 1 is a perspective view of an exemplary embodiment of an energy-absorbing anchor for securing a child safety seat to a vehicle, schematically illustrating a coupling of the energy-absorbing anchor to a tether of the child safety seat.

FIG. 1 shows an exemplary energy absorbing anchor 12 used in an upper anchorage of a child safety seat restraint system of a vehicle having a passenger seat 26 and a child safety seat 24. Energy absorbing anchor 12 is secured to a mounting portion 14 of the vehicle. In the depicted embodiment, mounting portion 14 is located on a package tray of the vehicle. However, it should be appreciated that the mounting portion could be located in other locations on the vehicle, as described below. A tether coupling portion 16 is coupled to a latchable portion 18 of an upper tether 22 of child safety seat 24. Energy absorbing anchor 12 and tether 22 form the upper anchorage of the child safety seat restraint system.

Figure 2:
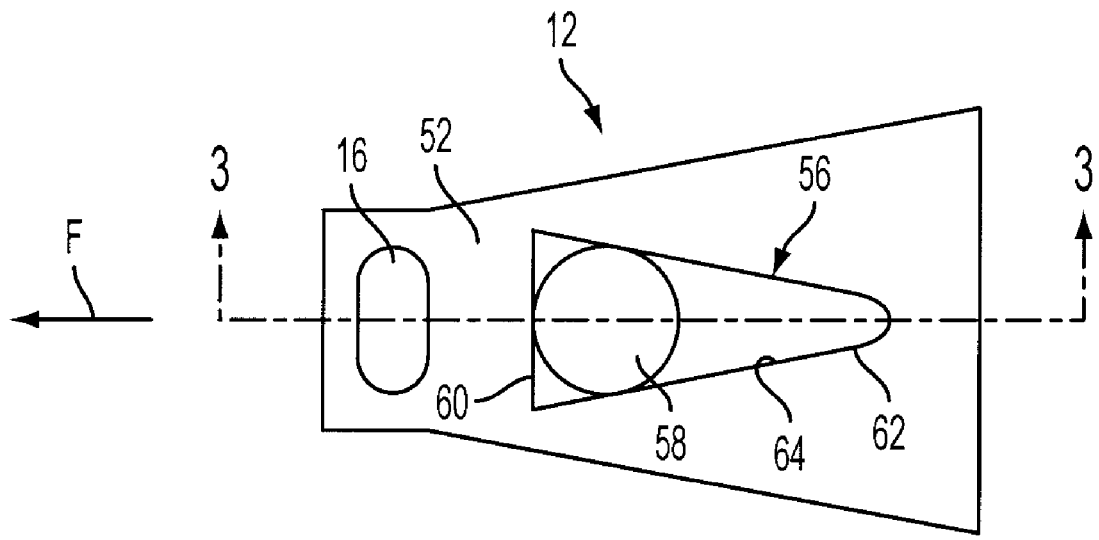
FIG. 2 is a plan view of a first exemplary embodiment of an energy absorbing anchor.

FIG. 2 is a plan view of a first exemplary embodiment of energy absorbing anchor 12. Typically, energy absorbing anchor 12 includes a bracket 52. In some embodiments, as shown in FIG. 2, bracket 52 may be formed of a substantially planar metal strap. Bracket 52 may include a first end having a tether coupling portion 16. In the depicted embodiment, tether coupling portion 16 includes an opening to be coupled with latchable portion 18 of tether 22. Bracket 52 may include a tapered hole 56, and anchor 12 may further include a protrusion 58 mounted to the vehicle portion 14 and configured to extend through the tapered hole 56 to thereby secure the anchor 12 to the vehicle. A wide portion 60 of tapered hole 56 is adjacent to tether coupling portion 16. A narrow portion 62 of tapered hole 56 is narrower than a width of the protrusion and is adjacent to a second end of bracket 52 which is opposite to tether coupling portion 16. A width of bracket 52 increases from the first end to the second end. In other words, the width of bracket 52 increases as the width of tapered hole 26 decreases such that the width of bracket 52 corresponding to wide portion 60 of tapered hole 56 is smaller than the width of bracket 52 corresponding to narrow portion 62 of tapered hole 56. In the depicted embodiment, the width of bracket 52 increases gradually toward the second end of bracket 52. Tapered hole 56 includes walls 64. The walls 64 of the tapered hole are typically symmetrically tapered in a straight line. Alternatively, the walls may be asymmetric, for example, only one wall may taper. Further, the walls may be curved, or a combination of straight and curved. In some embodiments, to reduce noise from engagement of the protrusion 58 and the walls 64 of the tapered hole, the walls may be coated with a plastic liner.

Protrusion 58 is positioned to be adjacent to the wide portion of the tapered hole and extends through tapered hole 56 to secure bracket 52 to the mounting portion (not shown) of the vehicle. Protrusion 58 may be cylindrical in shape, as shown. Alternatively, protrusion 58 may be of another other suitable shape, such as square, polygonal, or elliptical, and may include a cap or be in a loop form to prevent disengagement, as described below.

Figure 3:
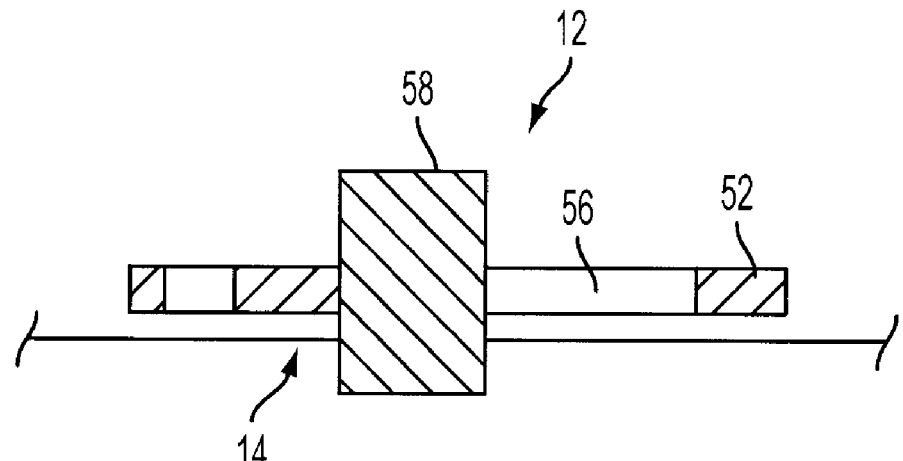
FIG. 3 is a sectional view of a portion of energy absorbing anchor of FIG. 2, taken along the line 2-2 of FIG. 2.

FIG. 3 is a sectional view of a portion of energy absorbing anchor 12, taken along the line 2-2 of FIG. 2. As shown in FIG. 3, protrusion 58 is formed as a cylindrical pin that secures bracket 52 to a mounting portion 14 of the vehicle.

The bracket's thickness, yield strength, shape of tapered hole, and configuration of protrusion, allow the bracket to deform in response to a force applied to it. During normal vehicle driving, bracket 52 is secured by protrusion 58 so that it is maintained in a normal configuration as shown in FIG. 2. During a collision event, the inertia of the child safety seat system generates a forward force (F) applied to the energy absorbing anchor as indicated by an arrow. When the force is below a predetermined level, bracket 52 is configured to be maintained in the normal configuration so that the child safety seat is inhibited from moving. However, as the force exceeds the predetermined level, bracket 52 may be moved in the direction of the force. As a result, protrusion 58 is drawn along a length of tapered hole 56 towards the narrower portion, thereby deforming a portion of walls 64 of tapered hole 56 to widen tapered hole 56, thus absorbing energy. Since a width of tapered hole 56 becomes narrow as the bracket moves, load applied to bracket 52 gradually ramps up.

Figure 4:
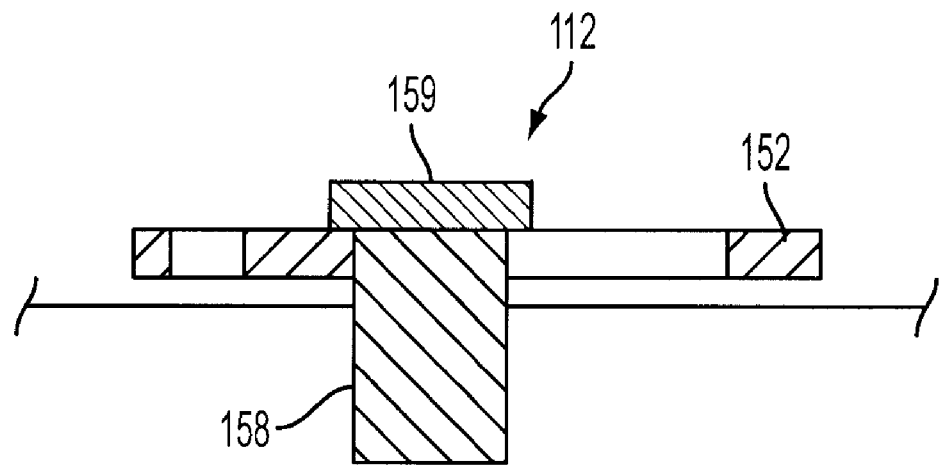
FIG. 4 is a sectional view of a second exemplary embodiment of an energy absorbing anchor.

FIG. 4 is a sectional view of a second exemplary embodiment of energy absorbing anchor 112. In each of the embodiments, similar reference characters refer to similar parts which will not be re-described in detail. In the depicted embodiment, protrusion 158 includes a cap 159 which at least partially covers portions of a bracket 152. The cap 159 may restrict vertical movement of bracket 152 relative to the bolt, to thereby further secure the anchor 112 to the vehicle.

Figure 5:
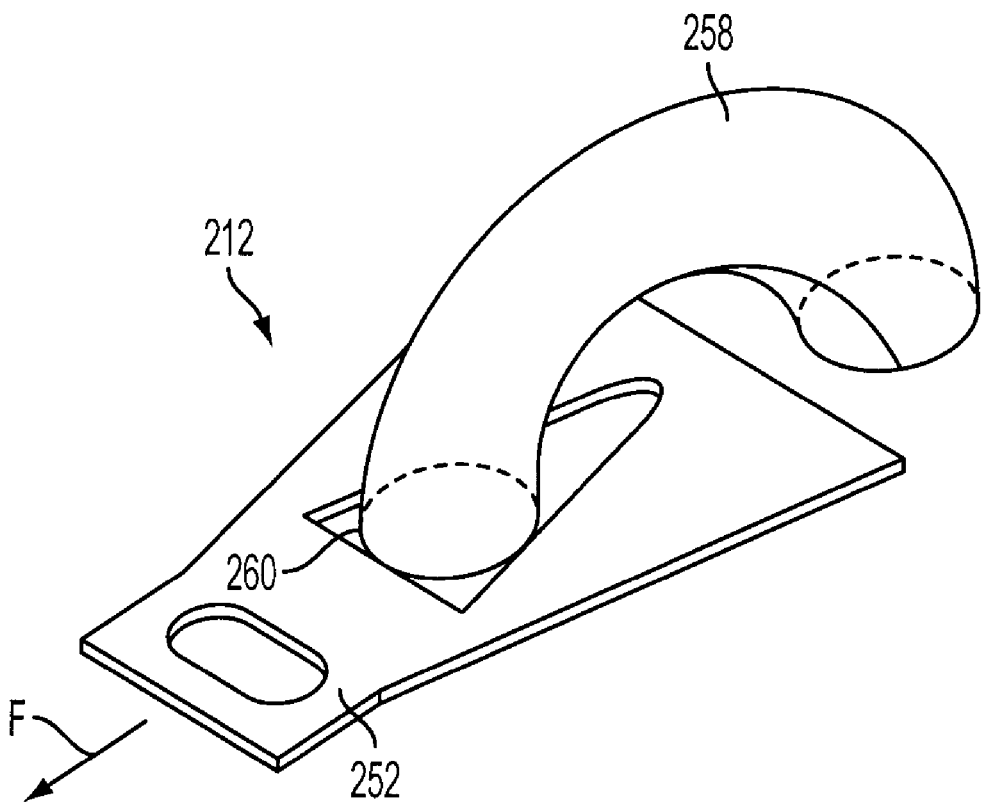
FIG. 5 is a perspective view of a third exemplary embodiment of an energy absorbing anchor.

FIG. 5 is a perspective view of a third exemplary embodiment of an energy absorbing anchor 212. Anchor 212 typically includes a curved protrusion 258. Protrusion 258 is typically curved upward and away from the direction of pulling force. In the depicted embodiment protrusion 258 is formed in a half loop. A first end of the loop is configured to be positioned in a tapered hole 260 to secure a bracket 252 to a mounting portion (not shown) of the vehicle. A second end of loop is configured to be positioned outside tapered hole 260 and secured to the mounting portion of the vehicle in an adjacent location, such that a portion of the bracket travels through the loop. Again, protrusion 258 in the shape of a loop may restrict vertical movement of bracket 252. It should be noted that the second end of the loop may be disposed in other suitable positions around tapered hole 260, in addition to the depicted position.

It should be appreciated that variations to the embodiment described above are possible. For example, in the depicted embodiment, a cross-section of protrusion 58 is circular. However, the cross section of protrusion 58 may be of any suitable shape such as elliptical, polygonal, square, etc., as described above.

Figure 6:
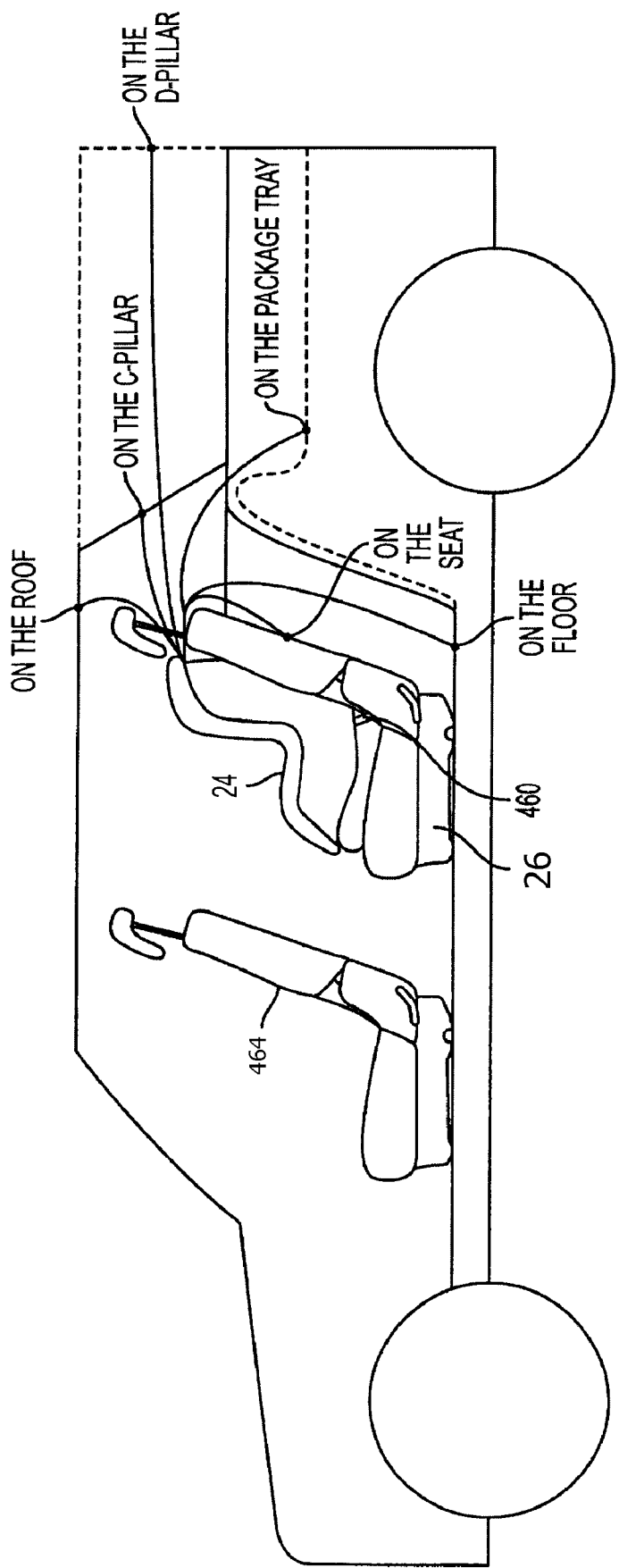
FIG. 6 is a cross-sectional view of a vehicle, schematically illustrating mounting portions in the vehicle to secure an attachment assembly which forms an upper anchorage and lower anchorage for a child safety seat.

FIG. 6 is a cross-sectional view of a vehicle having a driver seat 464, passenger seat 26, and child safety seat 24, schematically illustrating mounting portions of a vehicle chassis to which energy absorbing anchor 12 may be secured when used as an upper anchorage or a lower anchorage for child safety seat 24. Energy absorbing anchor 12 may be used in an upper anchorage for an upper tether of the child safety seat. The upper anchorage may be mounted at various portions of the vehicle. As shown in FIG. 6, the energy absorbing anchor for the upper anchorage may be mounted on the package tray, roof, seat, floor, or C-pillar of a sedan type vehicle. The energy absorbing anchor for the upper anchorage may be further mounted on the D-pillar of a wagon as indicated by the vertical dashed line in FIG. 6.

Further, it will be appreciated that energy-absorbing anchor 12 may also be used as a lower anchorage. For example, energy-absorbing anchor 12 may be coupled to a lower end of child safety seat 24 and the mounting portion may be positioned in a bight 460, thereby forming a lower anchorage.

While the bracket used in the above embodiments has been described as being metal, it will be appreciated that other suitable materials may be used that absorb energy when deformed in the manner described above.

The energy absorbing anchor embodiments described above have various advantages. For example, variable loads applied to the child safety seat during a collision are desirable in some situations. The walls of the tapered hole are configured to increasingly absorb energy as a width of the tapered hole decreases. The load applied to the child safety seat gradually ramps up, thus reducing jerking of an occupant of the child safety seat. Further, in one embodiment, because of the presence of plastic coating on the tapered hole, noise generated due to friction between the bracket and the protrusion during the collision can be reduced. Further, since the bracket may include a one-piece metal sheet with a tapered hole, it may be easy to manufacture. Furthermore, the energy absorbing anchor may be compact and substantially planar. Thus, it may be easier to be disposed in the vehicle or it can be designed to be at least partially hidden from view of to the customers, which improves the aesthetic appearance.

It will be appreciated that the processes disclosed herein are exemplary in nature, and that these specific embodiments are not to be considered in a limiting sense, because numerous variations are possible. The subject matter of the present disclosure includes all novel and non-obvious combinations and subcombinations of the various structures, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of methods and system component configurations, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An energy absorbing anchor for securing a child safety seat to a mounting portion of a vehicle and coupling to a tether of the child safety seat, the energy absorbing anchor comprising:

a bracket including:

a first end having a tether coupling portion;

a second end opposite to the first end, the second end having a greater width than the first end; and a tapered hole having a wide portion adjacent to the first end of the bracket and a narrow portion adjacent to the second end of the bracket, wherein walls of the tapered hole are tapered from the wide portion at a first end of the hole to the narrow portion at a second end of the hole, wherein a width of the bracket increases from the first end of the bracket to the second end of the bracket such that a width of the bracket corresponding to the wide portion of the tapered hole is smaller than a width of the bracket corresponding to the narrow portion of the tapered hole; and a protrusion extending through the tapered hole to secure the bracket to the mounting portion of the vehicle, wherein the protrusion is positioned to be adjacent to the wide portion of the tapered hole, and wherein the narrow portion of the tapered hole is narrower than a width of the protrusion;

wherein, when the bracket is pulled in tension, the protrusion is drawn along a length of the tapered hole towards the narrow portion and towards the second end of the bracket with the greater width, thereby deforming a portion of the walls of the tapered hole to widen the tapered hole, the walls of the tapered hole being configured to increasingly absorb energy as a width of the tapered hole decreases;

wherein the protrusion includes at least a portion of a loop having one end positioned inside the tapered hole and secured to a first mounting portion of the vehicle and another end positioned outside the tapered hole and secured to a second mounting portion of the vehicle such that a portion of the bracket travels through the loop and the loop curves upward and away from a direction of a pulling force.

2. The energy absorbing anchor of claim 1, wherein the bracket is formed of a substantially planar metal strap.

3. The energy absorbing anchor of claim 1, wherein the tether coupling portion includes an opening.

4. The energy absorbing anchor of claim 1, wherein the protrusion includes at least a portion of a loop having one end positioned inside the tapered hole and secured to a first mounting portion of the vehicle and another end positioned outside the tapered hole and secured to a second mounting portion of the vehicle such that a portion of the bracket travels through the loop and the loop curves upward and away from a direction of a pulling force.

5. The energy absorbing anchor of claim 1, wherein the tapered hole is coated with plastic material configured to reduce noise generated due to friction between the protrusion and the walls of the tapered hole.

6. The energy absorbing anchor of claim 1, wherein the energy absorbing anchor is coupled to an upper end of the child safety seat, to thereby form an upper anchorage.

7. The energy absorbing anchor of claim 6, wherein the vehicle mounting portion is located on one of a C-pillar or a D-pillar of the vehicle.

8. The energy absorbing anchor of claim 6, wherein the vehicle mounting portion is located on a roof of the vehicle.

9. The energy absorbing anchor of claim 6, wherein the vehicle mounting portion is located on a package tray of the vehicle.

10. The energy absorbing anchor of claim 6, wherein the vehicle mounting portion is located on a seat of the vehicle.

11. The energy absorbing anchor of claim 6, wherein the vehicle mounting portion is located on a floor of the vehicle.

12. The energy absorbing anchor of claim 1, wherein the energy absorbing anchor is coupled to a lower end of the child safety seat and the vehicle mounting portion is positioned in a bight of a seat of the vehicle, thereby forming a lower anchorage.

13. The energy absorbing anchor of claim 1, wherein the width of the bracket increases gradually toward the second end of the bracket.

14. An energy absorbing anchor for securing a child safety seat to a vehicle, the energy absorbing anchor comprising:

a bracket having a first end and a second end, wherein a width of the bracket increases gradually from the first end to the second end, such that the second end has a greater width than the first end;

a protrusion to secure the bracket to a mounting portion of the vehicle;

a tapered hole in the bracket for absorbing energy wherein walls of the tapered hole are tapered from a wide portion adjacent the first end of the bracket to a narrow portion adjacent the second end of the bracket, to allow loads absorbed by the bracket to gradually increase as the protrusion is drawn from the wide portion of the tapered hole along a length of the tapered hole towards the narrow portion of the tapered hole and towards the second end of the bracket with the greater width, thereby deforming a portion of the walls of the tapered hole;

wherein the protrusion includes at least a portion of a loop having one end positioned inside the tapered hole and secured to a first mounting portion of the vehicle and another end positioned outside the tapered hole and secured to a second mounting portion of the vehicle such that a portion of the bracket travels through the loop and the loop curves upward and away from a direction of a pulling force.

* * * * *